United States Patent [19]

Utoh et al.

[11] Patent Number: 4,803,724
[45] Date of Patent: Feb. 7, 1989

[54] HAND SET

[75] Inventors: Yoshihiro Utoh, Hino; Koichiro Suda, Fuchu, both of Japan

[73] Assignee: Kabushiki Kaisha Toshiba, Kawasaki, Japan

[21] Appl. No.: 17,702

[22] Filed: Feb. 24, 1987

[30] Foreign Application Priority Data

Feb. 28, 1986 [JP] Japan .......................... 61-28758[U]

[51] Int. Cl.$^4$ .......................................... H04M 1/03
[52] U.S. Cl. ................................ 379/433; 381/158
[58] Field of Search ............. 379/428, 433, 437, 440, 379/370, 431; 381/205, 169, 157, 188, 158

[56] References Cited

U.S. PATENT DOCUMENTS

| 4,163,875 | 8/1979 | Cogan | 379/433 |
| 4,319,095 | 3/1982 | Cogan | 379/433 |
| 4,456,794 | 6/1984 | Strömer et al. | 379/433 |
| 4,633,044 | 12/1986 | Nakajima | 379/433 |

FOREIGN PATENT DOCUMENTS

| 2358602 | 6/1975 | Fed. Rep. of Germany | 379/433 |
| 2440899 | 3/1976 | Fed. Rep. of Germany | 379/433 |
| 0074857 | 4/1985 | Japan | 379/433 |

Primary Examiner—Jin F. Ng
Assistant Examiner—Randall S. Vaas
Attorney, Agent, or Firm—Finnegan, Henderson, Farabow, Garrett, & Dunner

[57] ABSTRACT

This invention is concerned with arrangement for fitting a sender onto a hand set. The hand set of the invention enables a float set type sender to be set onto a hand set case by using a holder which is designed to set a pressure contact set type sender assembly. The holder includes not only pressure contact means for firmly setting the pressure contact set type sender assembly onto a talk sending surface of the hand set case but also pressure contact means for setting the float set type sender assembly on the talk sending surface of the hand set case in the floated state. Different kinds of senders can be fitted to the hand set case merely by means of a single holder. Thus, the hand set of the invention can be put in common use for different kinds of senders.

13 Claims, 7 Drawing Sheets

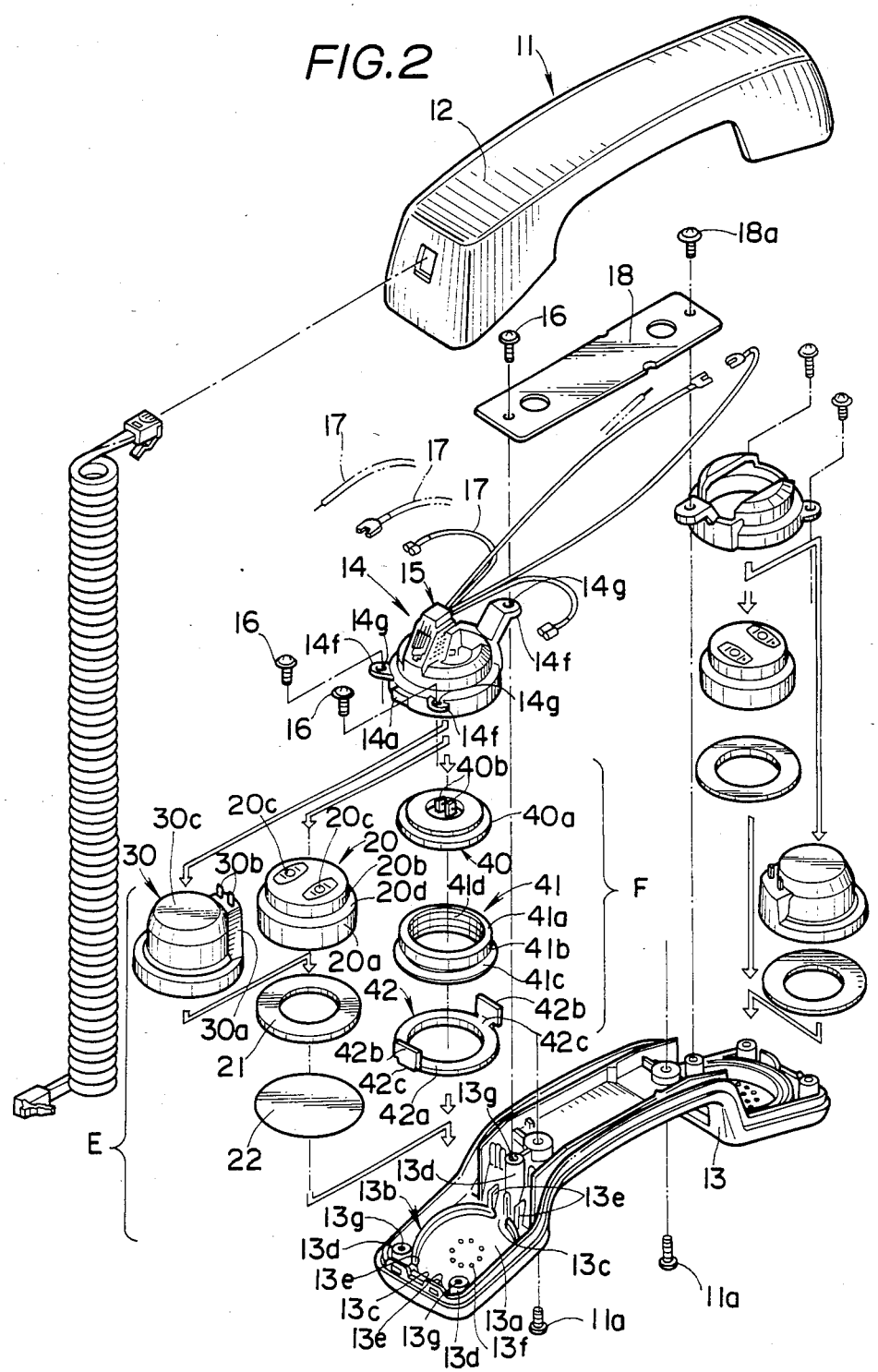

(a)

(b)

(a)

(b)

(a)

(b)

HAND SET

BACKGROUND OF THE INVENTION

The present invention relates to a hand set and more particularly to arrangement for setting a sender in the hand set.

Generally, a sender is classified into two types, one of them being a pressure contact set type sender such as dynamic type sender, carbon type sender or the like which is set in a hand set case by bringing it in pressure contact with the inner surface of a talk sending portion and the other one being a float set type sender such as ceramic type sender or the like which is set in a hand set case in the floated state by holding it with the aid of a case made of elastomeric material such as rubber or the like which in turn is fixedly secured to the hand set case.

To facilitate understanding of the present invention it will be helpful that a conventional hand set will be described below.

FIG. 1 illustrates a conventional hand set with a dynamic type sender incorporated therein by way of a perspective view in the disassembled state. A hand set case 1 is divided into an upper case 2 and a lower case 3 and a sender 4 is set onto the lower case 3. The sender 4 in the illustrated hand set is fixedly secured to the lower case 3 in such a manner that an annular holder 5 is placed on the sender 4 and it is then threadably engaged to bosses 3a on the lower case 3 using screws 6.

Further, a connecting block 7 including a modular jack holding portion 7a is fitted onto the sender 4 and a modular jack 8 is mounted on the lower case 3 by fitting it onto the holding portion 7a. The modular jack 8 has terminals 8a which are connected to terminals 7b on the connecting block 7. The modular jack 8 mounted on the lower case in that way assumes a position where a plug insert portion 8b is aligned with an opening 2a on the upper case when on the latter is fitted onto the lower case 3.

On the other hand, a hand set with a ceramic type sender incorporated therein has a problem that characteristics of the sender are readily affected by vibration, shock imparted from the outside or the like. In view of the problem as mentioned above the sender is accommodated in a cylindrical member made of elastomeric material such as rubber or the like and it is then set onto a lower case of the hand set by fastening the lower end of the cylindrical member thereto by means of screws with an attachment piece interposed therebetween.

Since the conventional hand set is constructed in the above-described manner, there is a necessity for preparing a hand set case separately in dependence on the kind of a sender employed for the hand set, because a manner of mounting the sender on the hand set case is different from sender to sender. This leads to drawbacks that a large amount of expenditure is required for preparing a molding die for each of the hand set cases and moreover operation for controlling associated parts and components becomes complicated.

SUMMARY OF THE INVENTION

Hence, the present invention has been made with the foregoing background in mind.

It is an object of the present invention to provide a hand set which assures that a single hand set case is put in common use for various kinds of senders.

It is other object of the present invention to provide a hand set which assures that cost required for producing it is reduced and operation for controlling associated parts and components is performed easily.

It is another object of the present invention to provide a hand set which assures that operation for mounting a sender, particularly, a float set type sender on a hand set case is performed easily.

To accomplish the above objects there is proposed according to the present invention a hand set comprising a hand set case including a talk sending surface having a plurality of sound holes formed thereon and one fastening means disposed in the vicinity of the talk sending surface, a holder including pressure contact means for firmly placing a pressure contact set type sender assembly and a float set type sender assembly on the talk sending surface of the hand set case and other fastening means adapted to be operatively connected to the one fastening means, and either of the pressure contact set type sender assembly and the float set type sender assembly being clamped between the pressure contact means of the holder and the talk sending surface of the hand set case by operatively connecting the other fastening means on the holder to the one fastening means on the hand set case.

Other objects, features and advantages of the present invention will become readily apparent from reading of the following description which has been prepared in conjunction with the accompanying drawings.

BRIEF DESCRIPTION OF THE DRAWINGS

The accompanying drawings will be briefly described below.

FIG. 2 is a perspective view of a hand set in accordance with an embodiment of the present invention in the disassembled state, particularly illustrating how three kinds of senders are set onto a lower case.

FIG. 3 shows a holder usable for the hand set of the invention, wherein

FIG. 5 shows the state that a pressure contact set type sender is firmly set onto a hand set case, wherein FIG. 5(a) is a vertical sectional side view of an essential part of the hand set and FIG. 5(b) is a vertical sectional front view of the same.

FIG. 6 shows the state that another pressure contact set type sender is firmly set onto the hand set case, wherein FIG. 6(a) is a vertical sectional side view of an essential part of the hand set and FIG. 6(b) is a vertical sectional front view of the same, and FIG. 7 shows the state that a float set type sender is mounted on the hand set case in the floated state, wherein FIG. 7(a) is a vertical sectional side view of an essential part of the hand set and FIG. 7(b) is a vertical sectional float view of the same.

DETAILED DESCRIPTION OF THE PREFERRED EMBODIMENTS OF THE INVENTION

Figure 1:
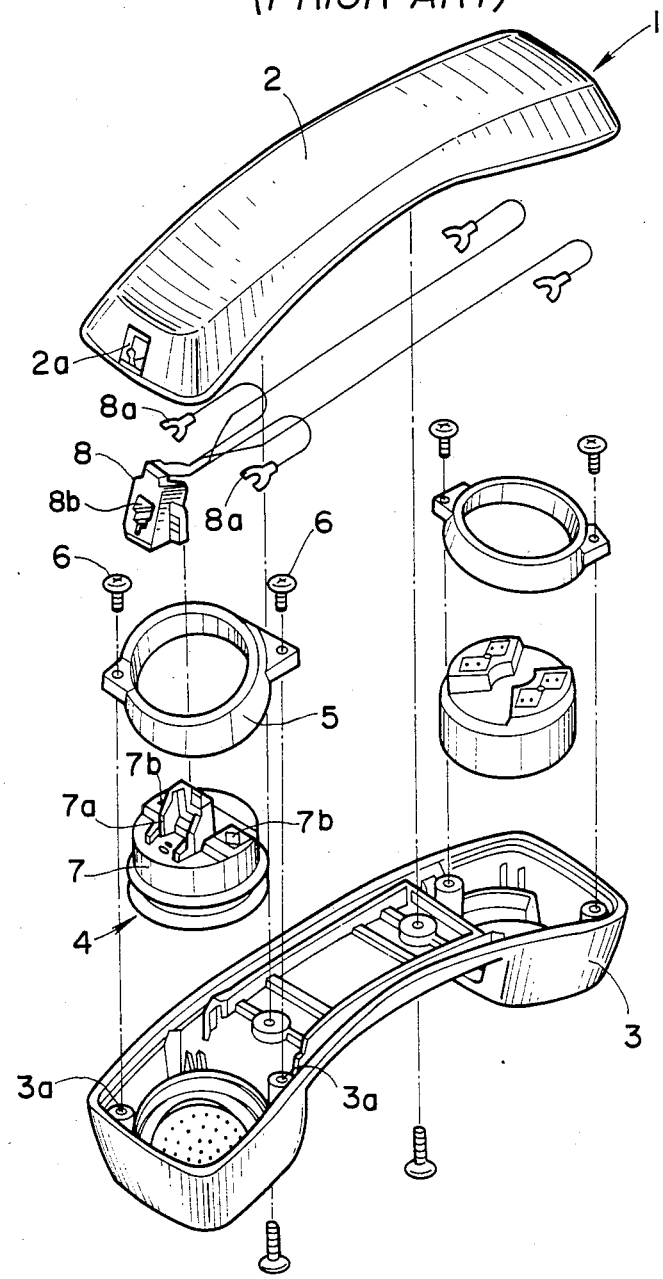
FIG. 1 is a perspective view of a conventional hand set in the disassembled state.

Now, the present invention will be described in a greater detail hereunder with reference to the accompanying drawings which illustrate preferred embodiments thereof.

FIG. 2 shows a hand set in accordance with the present invention by way of perspective view in the disassembled state. The hand set of the invention includes a case 11 which is divided into an upper case 12 and a lower case 13. The lower case 13 has a talk sending surface 13a at the left end part thereof as seen in the drawing which is formed with a plurality of sound holes 13f. The talk sending surface 13a is provided with an annular rib 13b in such a manner as to surround the sound holes 13f. The annular rib 13has cutouts 13c which are diametrically located opposite to one another. Further, the lower case 13 includes three bosses 13d at the position located outwardly of the annular rib 13b each of which has a threaded hole 13g. Ribs 13e stand upright at the position in the vicinity of the cutouts 13c.

Figure 3A:
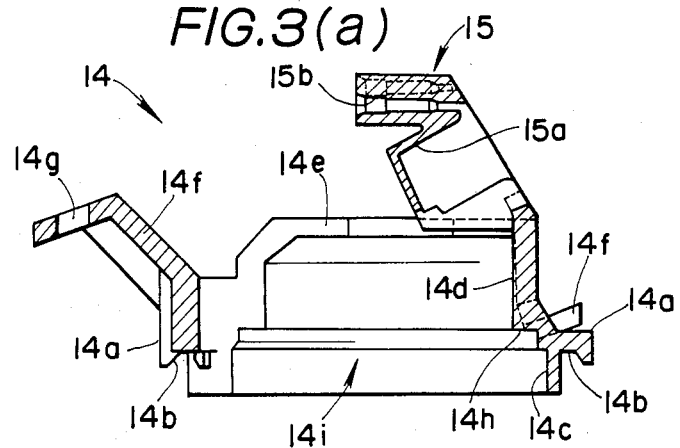
FIG. 3(a) is a vertical sectional view.
Figure 3B:
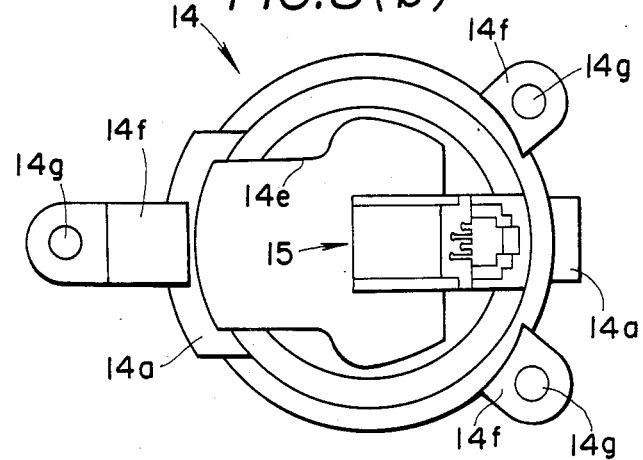
FIG. 3(b) is a plan view and FIG. 3(c) is a bottom view of the holder.
Figure 3C:
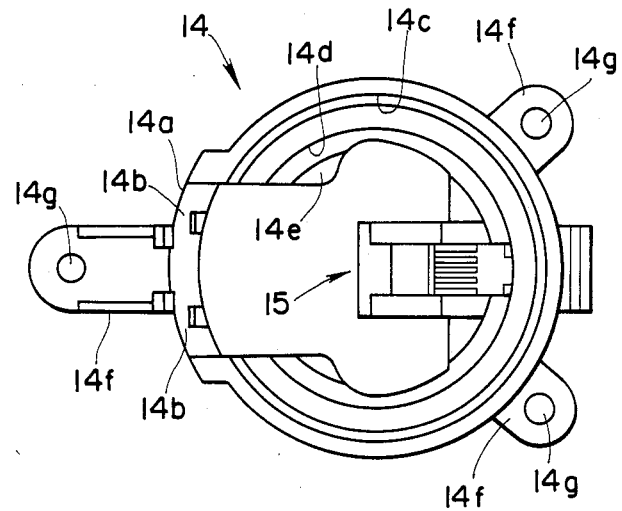

A holder 14 employed for the hand set of the invention is integrally provided with a modular jack 15. The holder 14 is designed in the substantially cylindrical configuration. As shown in FIG. 3, the holder 14 has a projection 14a outside the circumferential surface at the lower end part thereof and a groove 14b is formed on the lower surface of the projection 14a. Further, the holder 14 has a cavity 14i of which interior is exposed to the outside in the downward direction. Specifically, as shown in FIG. 3(a), the interior of the cavity 14i comprises a larger diameter portion 14c and a smaller diameter portion 14d of which upper open end is formed with a flange 14e which extends in the inward direction. The modular jack 15 is so located that it covers a part of the opening of the smaller diameter portion 14d and a modular plug insert hole 15a is formed in the inclined state. Further, the holder 14 has three lugs 14f outside the circumferential surface thereof each of which is formed with a hole 14g.

Figure 4:
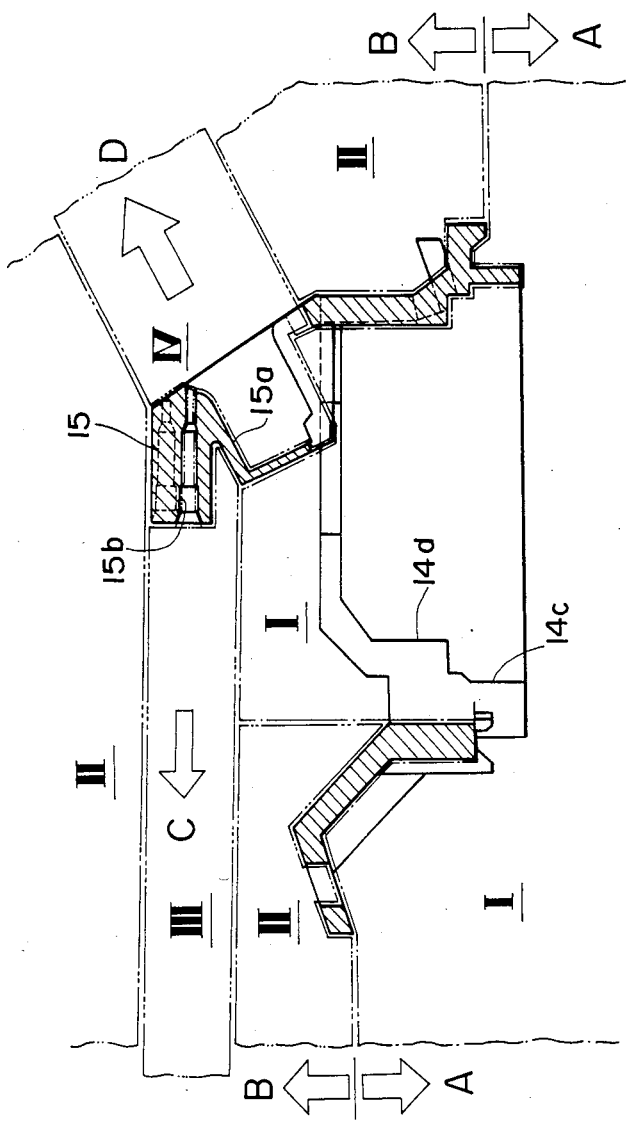
FIG. 4 is a fragmental vertical sectional view of a molding die for molding the holder as shown in FIG. 3, particularly illustrating the assembled state of the molding die.

With reference to FIG. 4, the holder as constructed in the above-described manner is molded with the use of a molding die comprising a lower die half I, an upper die half II and cores III and IV, wherein the lower die half I is displaced in the direction as identified by an arrow mark A, the upper die half II is displaced in the direction as identified by an arrow mark B, the core III is displaced in the direction as identified by an arrow mark C and the core IV is displaced in the direction as identified by an arrow mark D after completion of molding. Specifically, the lower die half I forms the outer contour of the lower part of the holder 14, the inner contour of the larger diameter portion 14c and the smaller diameter portion 14d and the outer contour of the lower part of the modular jack 15, the upper die half II forms the outer contour of the holder 14 and the outer contour of the upper part of the modular jack 15, the core III forms a lead wire insert hole 15b in the modular jack 15, and the core IV forms a modular plug insert hole 15a of the modular jack 15.

As shown in FIG. 2, a dynamic type sender 20 of which replacement can be effected easily, a dynamic type sender 30 which is adapted to carry out connection to a cord by soldering operation without any use of screw and connector terminal for the purpose of cost reduction and a ceramic type sender 40 can be employed as a sender usable for the hand set of the invention.

The dynamic type sender 20 includes a larger diameter cylindrical portion 20a and a smaller diameter cylindrical portion 20b and terminals 20c stand upright from the end surface of the smaller diameter cylindrical portion 20b.

Figure 5:
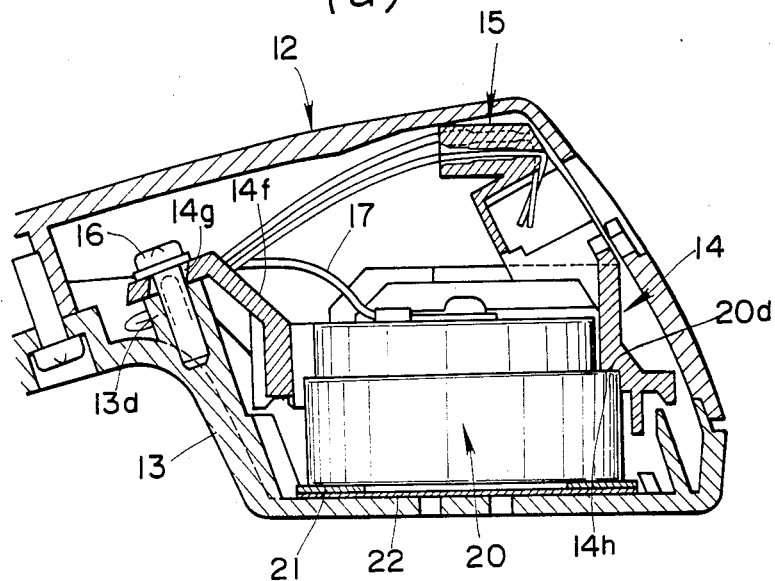
Figure 5:
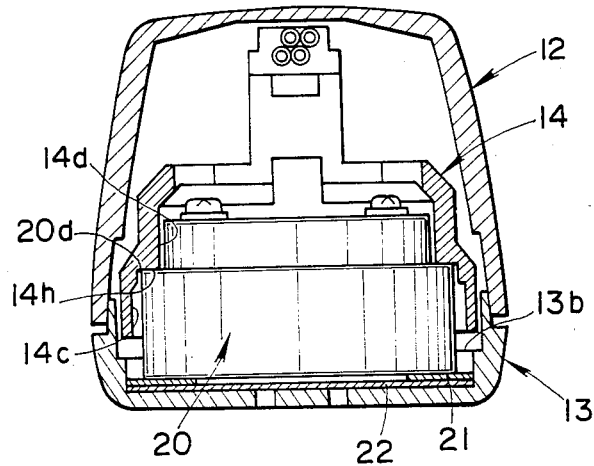

The sender 20 is fitted to the lower case 13 in the following manner by using a plate-shaped rubber ring 21 and a disc-shaped cloth 22 to constitute a pressure contact set type sender assembly E as shown in FIG. 2. First, the cloth 22 and the rubber ring 21 are superimposed one above another and they are then accommodated within the interior of the annular rib 13b on the lower case 13. Thereafter, the sender 20 is placed on them and it is then covered with the holder 14 which in turn is threadably engaged to the bosses 13d on the lower case 13 by means of screws 16 which are inserted through the holes 14g of the lugs 14f. As will be apparent from FIG. 5, the sender assembly E fastened to the lower case 13 in that way is brought in pressure contact with the lower case 13 by allowing the step 14h between the larger diameter portion 14c and the smaller diameter portion 14d of the holder 14 to come in pressure contact with the step 20d between the larger diameter portion 20a and the smaller diameter portion of the sender 20.

The dynamic type sender 30 is designed in the cylindrical configuration and includes a projected part 30a on the one side wall thereof. Terminals 30b stand upright on the upper surface of the projected part 30a.

Figure 6:
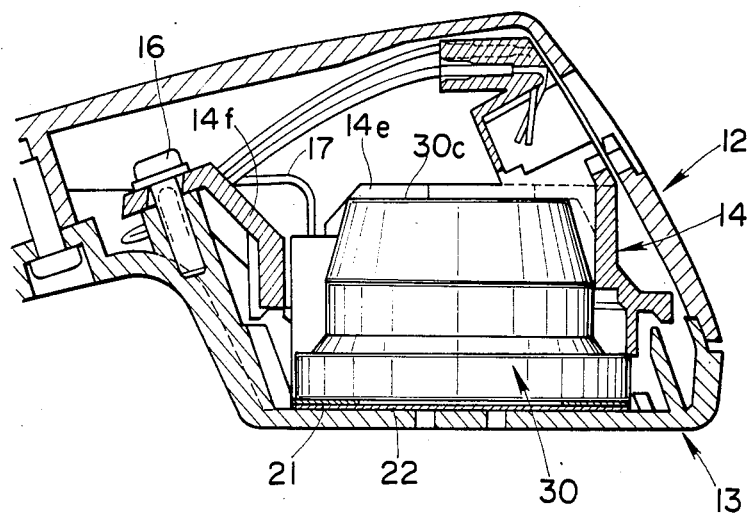
Figure 6:
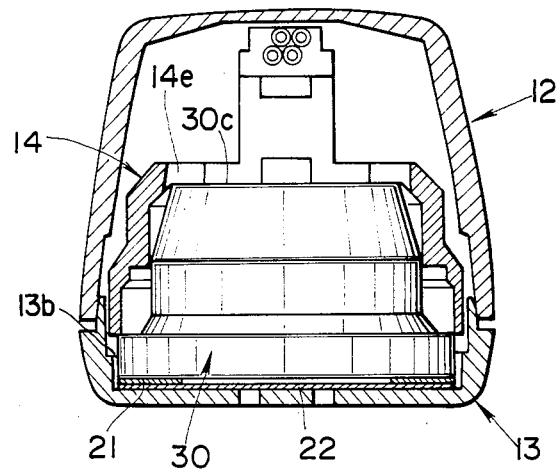

The sender 30 also is fastened to the lower case 13 in the same manner as the sender 20 by using a plate-shaped rubber ring 21 and a disc-shaped cloth 22 to constitute another pressure contact set type sender assembly E as shown in FIG. 2. It should be noted that in the case of the sender 30 the latter is brought in pressure contact with the lower case 13 by allowing the flange 14e of the holder 14 to come in pressure contact with the top surface 30c thereof, as shown in FIG. 6.

Figure 7:
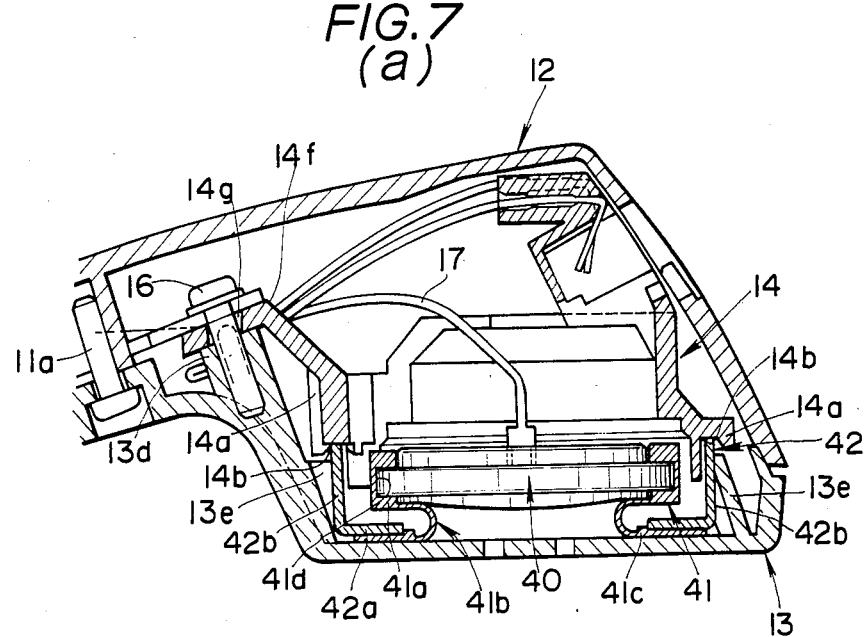
Figure 7:
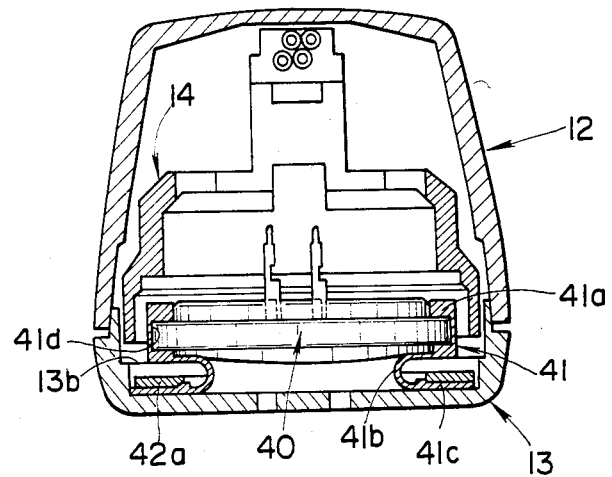

Next, the ceramic type sender 40 is designed in the disc-shaped configuration and includes a flange 40a around the circumferential surface and terminals 40b on the upper surface thereof. The sender 40 is fitted to the lower case 13 by using the holder 14, a casing 41 made of elastomeric material and a plate-shaped fitting member 42, as shown in FIG. 2. As will be apparent from FIG. 7, the casing 41 comprises a cylindrical portion 41a, a neck portion 41b and an annular base 41c, and an annular groove 41d is formed on the inner surface of the cylindrical portion 41a. The fitting member 42 comprises an annular plate 42a and tongues 42b which stand upright by bending them at their bottom 42c. The bottom 42c of each of the tongues 42b is cut out on both the sides thereof so that the width at the bottom 42c is less than that at the other part of the tongue 42.

The sender 40 is fitted to the lower case 13 in the following manner. First, the sender 40 is fitted into the annular groove 41d of the casing 41 and the base 41c is then fitted through the opening of the annular plate 42a of the fitting member 42. Next, the base 41c of the case 41 and the annular plate 42a of the fitting member 42 both of which constitute the assembly F are accommodated in the space as defined by the annular rib 13b of the lower case 13 and the bottoms 42c of the tongues 42b on the fitting member 42 are fitted into the cutouts 13c on the lower case 13. At this moment the tongues 42b stand upright on the lower case 13 while resting against the ribs 13e and the holder 14 is placed on the tops of the ribs 13e so that it is fastened to the bosses 13d on the lower case 13 by means of screws 16 which are inserted through the holes 14g of the lugs 14f. Since the upper end of the tongue 42b is located in vertical alignment with the groove 14b on the projection 14a of the holder 14, the fitting member 42 is depressed by the holder 14. The casing 41 made of elastomeric material is brought in pressure contact with the lower case 13 in such a manner that the base 41c is located below the annular plate 42a of the fitting member 42. Thus, the sender 40 is supported in the floated state within the interior of the sender accommodating cavity 13a of the lower case 13.

Then, the sender 20, 30 or 40 fitted to the lower case 13 in that way is connected to the modular jack 15 via cord 17. Thereafter, the upper case 12 is fitted to the lower case 13 and the former is then firmly secured to the latter with the use of screws 11a. Incidentally, in the case where the ceramic type sender 40 is employed for the hand set, a weight 18 is fastened to the lower case 13 by means of screws 18a and 16, because the sender 40 is light in weight.

While the present invention has been described above only with respect to a single preferred embodiment thereof, it should of course be understood that it should not be limited only to this but various changes or modifications may be made without departure from the spirit and scope of the invention as defined by the appended claims.

What is claimed is:

1. A hand set, comprising:
a case including a talk sending surface having a plurality of sound holes therein and a first fastenable portion disposed proximate said talk sending surface;
a holder including a second fastenable portion and means for firmly placing in the alternative on said talk sending surface of said case both a pressure contact set type sender assembly and a float set type sender assembly, said holder having a cavity with an upper part which accommodates the placed one of said pressure contact set type sender assembly and said float set type sender assembly; and
fastening means for fastening said first and second fastenable portions together and for clamping said placed one of said pressure contact set type sender assembly and said float set type sender assembly between said placing means of said holder and said talk sending surface of said case.

2. A hand set as defined in claim 1, wherein said talk sending surface of said case includes an annular rib in which the lower part of the placed one of said pressure contact set type sender assembly and said float set type sender assembly is accommodated.

3. A hand set as defined in claim 1, wherein said first fastenable portion includes a plurality of bosses arranged along the periphery of said talk sending surface, said second fastenable portion includes a plurality of lugs arranged to be superimposed on said bosses, and said fastening means includes a plurality of fasteners fastening each of said lugs to one of said bosses.

4. A hand set as defined in claim 3, wherein each of said bosses includes a threaded hole, each of said lugs includes a through hole, and each of said fasteners is a screw which is inserted through one of said through holes and threaded into one of said threaded holes.

5. A hand set as defined in claim 1, wherein:
said holder includes a step for engaging said pressure contact set type sender assembly within said cavity at times when said pressure contact set type sender assembly is placed on said talk sending surface of said case to bring said pressure contact set type sender assembly in pressure contact with said talk sending surface; and
said holder includes a projection on an outside circumferential surface thereof for engaging said float set type sender assembly at times when said float set type sender assembly is placed on said talk sending surface of said case to bring said float set type sender assembly in pressure contact with said talk sending surface.

6. A hand set, comprising;
a case including a talk sending surface having a plurality of sound holes therein and a first fastenable portion disposed proximate said talk sending surface;
a float set type sender assembly placed on said talk sending surface of said case, said sender assembly including a float set type sender having an annular flange and a cylindrical casing made of elastomeric material, said elastomeric casing having an annular groove formed in an upper inner surface in which said flange of said float set type sender is fitted and an annular base around the circumferential surface of the bottom thereof, said annular base being disposed on said talk sending surface, said sender assembly further including a fitting member having an annular plate and tongues standing upright from the circumference of said annular plate, said annular plate of said fitting member being disposed on said base of said elastomeric casing placed on said talk sending surface of said case;
a holder including an internal cavity opening at the bottom thereof, projections on an outside circumferential surface thereof, and a second fastenable portion, said holder being disposed over said sender assembly with said float set type sender accommodated in said cavity, said projections engaging said tongues of said fitting member; and
fastening means for fastening said first and second fastenable portions together and for clamping said base of said elastomeric casing of said sender assembly between said annular plate of said fitting member and said talk sending surface of said case, said tongues of said fitting member being urged toward said talk sending surface by said projections of said holder.

7. A hand set as defined in claim 6, wherein said talk sending surface of said case includes an annular rib in which said annular plate of said fitting member is accommodated, said annular rib having cutouts in which the bottoms of said tongues of said fitting member are received.

8. A hand set defined in claim 7, wherein said case further includes vertical ribs projecting from said talk sending surface and located in alignment with said cutouts of said annular rib, said vertical ribs being radially outside said annular rib, said tongues of said fitting member resting against said vertical ribs.

9. A hand set as defined in claim 6, wherein:
said first fastenable portion includes a plurality of bosses arranged along the periphery of said talk sending surface, each of said bosses having a threaded hole;
said second fastenable portion includes a plurality of lugs arranged to be superimposed on said bosses, each of said lugs having a through hole; and said fastening means includes a plurality of screws inserted through said through holes and threaded in said threaded holes.

10. A hand set capable of using in the alternative both a sender assembly of the pressure contact set type and a sender assembly of the float set type, the pressure contact set type sender assembly including a pressure contact set type sender, an annular rubber ring disposed beneath said pressure contact set type sender, and a disc-shaped cloth disposed beneath said rubber ring, the float set type sender assembly including a float set type sender, a cylindrical casing floatably supporting said float set type sender and having an annular base, and a fitting member having an annular plate disposed on said annular base of said casing and tongues standing upright from the circumference of said annular plate, the hand set comprising:

a case including a talk sending surface having a plurality of sound holes therein and a plurality of bosses disposed proximate said talk sending surface, each of said bosses having a threaded hole, said disc-shaped cloth being disposed on said talk sending surface at times when said pressure contact set type sender assembly is used and said annular base of said casing being disposed on said talk sending surface at times when said float set type sender assembly is used;

a holder including an internal cavity opening at the bottom thereof, said cavity having a step engaging said pressure contact set type sender at times when said pressure contact set type sender assembly is used, projections on an outside circumferential surface thereof engaging said tongues of said fitting member at times when said float set type sender assembly is used, and a plurality of lugs arranged to be superimposed on said bosses of said case, each of said lugs having a through hold aligned with said threaded hole of one of said bosses of said case; and fastening means for fastening said bosses and said lugs together, for clamping said pressure contact set type sender between said step of said holder and said talk sending surface of said case with said rubber ring and said cloth disposed therebetween at times when said pressure contact set type sender assembly is used, and for clamping said fitting member and said base of said casing between said projections of said holder and said talk sending surface of said case at times when said float set type sender assembly is used.

11. A hand set as defined in claim 10, wherein said holder includes a modular jack formed integrally in an upper part thereof.

12. A hand set as defined in claim 10, wherein said talk sending surface of said case includes an annular rib having cutouts, said annular plate of said fitting member being accommodated in said annular rib and said tongues of said fitting member being received in said cutouts at times when said float set type sender assembly is used.

13. A hand set as defined in claim 12, wherein said case further includes vertical ribs projecting from said talk sending surface and located in alignment with said cutouts of said annular rib, said vertical ribs being radially outside said annular rib, said tongues of said fitting member resting against said vertical ribs at times when said float set type sender assembly is used.

* * * * *